US010065548B2

(12) United States Patent
Dunn et al.

(10) Patent No.: US 10,065,548 B2
(45) Date of Patent: Sep. 4, 2018

(54) SEAT CONTROL SYSTEM

(71) Applicant: Kongsberg Interior Systems II, Inc., Novi, MI (US)

(72) Inventors: Sean Dunn, Taylor, MI (US); Kelly Harvester, Brighton, MI (US)

(73) Assignee: Kongsberg Interior Systems II, LLC, Novi, MI (US)

( * ) Notice: Subject to any disclaimer, the term of this patent is extended or adjusted under 35 U.S.C. 154(b) by 295 days.

(21) Appl. No.: 15/000,652

(22) Filed: Jan. 19, 2016

(65) Prior Publication Data

US 2017/0203676 A1    Jul. 20, 2017

(51) Int. Cl.
*B60N 2/30* (2006.01)
*B60N 2/015* (2006.01)
*B60N 2/90* (2018.01)

(52) U.S. Cl.
CPC .......... *B60N 2/933* (2018.02); *B60N 2/01583* (2013.01); *B60N 2/305* (2013.01); *B60N 2/3011* (2013.01); *B60N 2002/948* (2018.02)

(58) Field of Classification Search
CPC ........ B60N 2/4435; B60N 2/305; B60N 2/30; B60N 2/3009; B60N 2/3011; B60N 2/3045; B60N 2/01583; B60N 2/943
USPC ................................................. 297/336, 326
See application file for complete search history.

(56) References Cited

U.S. PATENT DOCUMENTS

| | | | |
|---|---|---|---|
| 5,681,079 A | 10/1997 | Robinson | |
| 5,941,591 A * | 8/1999 | Tsuge | B60N 2/206 296/65.09 |
| 6,345,549 B1 | 2/2002 | Lance | |
| 6,375,246 B1 | 4/2002 | Nicola et al. | |
| 6,520,581 B1 | 2/2003 | Tame | |
| 6,523,899 B1 * | 2/2003 | Tame | B60N 2/01583 297/331 |
| 6,676,198 B2 | 1/2004 | Demptos et al. | |
| 6,739,668 B2 | 5/2004 | Coman et al. | |

(Continued)

FOREIGN PATENT DOCUMENTS

DE          103 10 424 A1    9/2004

OTHER PUBLICATIONS

English language abstract and machine-assisted English translation of DE 103 10 424 A1 extracted from www.espacenet.com on Feb. 11, 2016; 7 pages.

*Primary Examiner* — Milton Nelson, Jr.
(74) *Attorney, Agent, or Firm* — Howard & Howard Attorneys PLLC (57) ABSTRACT

A seat control system is used with a seat of a vehicle and includes a housing, a first pulley rotatable between first, second, and third positions, and a second pulley rotatable between first and second positions. The seat control system includes a first input cable rotating a first pulley when tensioned, a first output cable tensioned by the first pulley, and a second output cable tensioned by the second pulley. A pawl is coupled to and movable with the first pulley between the first, second, and third positions and selectively rotatable relative to the first pulley. The pawl engages the second pulley to couple and rotate the first and second pulleys from the first positions to the second positions. The pawl disengages the second pulley as the first pulley rotates from the second position to the third position to permit rotation of the second pulley to the first position.

25 Claims, 11 Drawing Sheets

(56) References Cited

U.S. PATENT DOCUMENTS

| | | |
|---|---|---|
| 6,793,285 B1 * | 9/2004 | Tame .................. B60N 2/3011 |
| | | 296/65.01 |
| 6,805,408 B2 | 10/2004 | Buhl et al. |
| 6,932,409 B2 | 8/2005 | Falchero et al. |
| 7,121,624 B2 | 10/2006 | Pejathaya et al. |
| 7,320,501 B2 | 1/2008 | Keyser |
| 7,434,862 B2 | 10/2008 | Lutzka et al. |
| 7,552,972 B2 | 6/2009 | Ferrari et al. |
| 7,802,490 B2 | 9/2010 | Ingraham |
| 8,544,956 B2 * | 10/2013 | Park .................. B60N 2/01583 |
| | | 297/326 |
| 8,864,209 B2 | 10/2014 | White et al. |
| 8,960,800 B2 | 2/2015 | Champ et al. |
| 2007/0080555 A1 * | 4/2007 | Lutzka ............... B60N 2/01583 |
| | | 296/65.03 |
| 2007/0296257 A1 * | 12/2007 | Nathan ................. B60N 2/206 |
| | | 297/325 |
| 2017/0057382 A1 * | 3/2017 | Elton .................. B60N 2/4435 |

* cited by examiner

SEAT CONTROL SYSTEM

BACKGROUND OF THE INVENTION

1. Field of the Invention

The subject invention relates to a seat control system for use with a seat of a vehicle.

2. Description of Related Art

There is a desire within the automotive industry to move a vehicle seat between design, folded, and stowed configurations. Different seat control systems have been developed which facilitate moving the vehicle seat between the configurations. One of the seat control systems has an input pulley and an output pulley selectively coupled to one another. An input cable is coupled to the first pulley. A pair of output cables are coupled to the output pulley with each output cable independently coupled to a pair of latches which couple the vehicle seat to the vehicle. When the vehicle seat moves from the design configuration to the folded configuration, the input cable tensions and rotates the first pulley. The second pulley is coupled to the first pulley and rotates in unison with the pulley, which unlocks the latches to allow the vehicle seat to move to the stowed configuration. Movement of the seat to the stowed configuration disconnects the second pulley from the first pulley and allows the second pulley to rotate back to its original position, which in-turn returns the latches to a lockable state. Movement of the vehicle seat to the folded configuration couples the latches to the vehicle.

Although effective, to decouple the latches again and move the vehicle seat to the stowed configuration, the vehicle seat must return to the design configuration in order to couple the first and second pulleys to each other once again. Then, the vehicle seat must once again move to the folded configuration before moving to the stowed configuration. As such, movement between the design, folded, and the stowed configurations is sequential and does not permit selective movement to the desired design or stowed configuration from the folded configuration. As such, there remains a need to provide an improved seat control system.

SUMMARY OF THE INVENTION AND ADVANTAGES

The subject invention provides a seat control system for use with a seat of a vehicle, with the seat having a seat bottom, a seat back, and first and second latches, with the seat movable between a design configuration, a plurality of folded configurations, and a stowed configuration. The seat control system includes a housing and a first pulley coupled to the housing and rotatable between a first position, a second position, and a third position. The seat control system further includes a second pulley coupled to the housing and rotatable between a first position and a second position.

The seat control system further includes a first input cable coupled to the first pulley, with the first input cable rotating the first pulley when tensioned. Furthermore, the seat control system includes a first output cable coupled to the first pulley and configured to be coupled to the first latch, with rotation of the first pulley tensioning the first output cable for actuating the first latch, and a second output cable coupled to the second pulley and configured to be coupled to the second latch, with rotation of the second pulley tensioning the second output cable for actuating the second latch.

The seat control system further includes a pawl coupled to and movable with the first pulley between the first, second, and third positions of the first pulley and selectively rotatable relative to the first pulley, with the pawl engaging the second pulley to couple the first and second pulleys such that the first and second pulleys rotate in unison from the first positions to the second positions for releasing the first and second latches, and the pawl disengaging the second pulley as the first pulley rotates from the second position to the third position to decouple the first and second pulleys and permit rotation of the second pulley back to the first position while the first pulley is in the third position for activating the second latch.

Accordingly, the seat control system provides selective independent rotation of the first and second pulleys. As such, the first and second output cables may be selectively tensioned independent of one another. The selective independent tensioning of the first and second output cables facilitates selective activation of the second latch independent of the first latch, allowing the second latch to couple the seat to the vehicle in the folded configuration. The selective independent rotation of the second pulley allows the second pulley to rotate, tension the second output cable, and release the second latch to allow for movement of the seat to the stowed configuration without tensioning the first input cable and rotating the first pulley. Therefore, the seat may move from the folded configuration to the stowed configuration without first having to move to the design configuration.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figure 1:
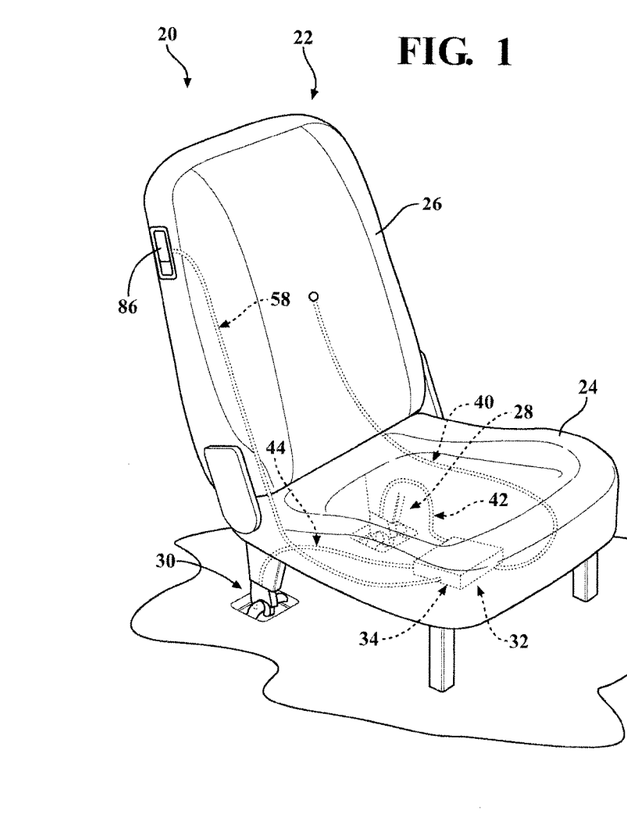
FIG. 1 is a perspective view of a seat assembly having a seat, first and second latches activated, and a seat control system shown in phantom.

Referring to the Figures, wherein like numerals indicates like or corresponding parts throughout the several views, a seat assembly 20 for a vehicle is generally shown in FIG. 1. The vehicle is generally a van, passenger car, or a truck; however, it is to be appreciated that the vehicle may be any configuration for providing transportation. Furthermore, the seat assembly 20 may be used for any non-transportation purposes, such as, but not limited to, home and office furnishings. The seat assembly 20 includes a seat 22 movable between a design configuration, a plurality of folded configurations, and at least one stowed configuration. The seat 22 includes a seat bottom 24, a seat back 26 pivotally coupled to the seat bottom 24, and first and second latches 28, 30 fixed to the seat bottom 24. Each of the seat bottom 24 and the seat back 26 may have a proximal end and a distal end with the seat bottom 24 and seat back 26 adjacent one another at the proximal ends and extending from the respective proximal ends to the respective distal ends, which are spaced from one another.

Figure 2:
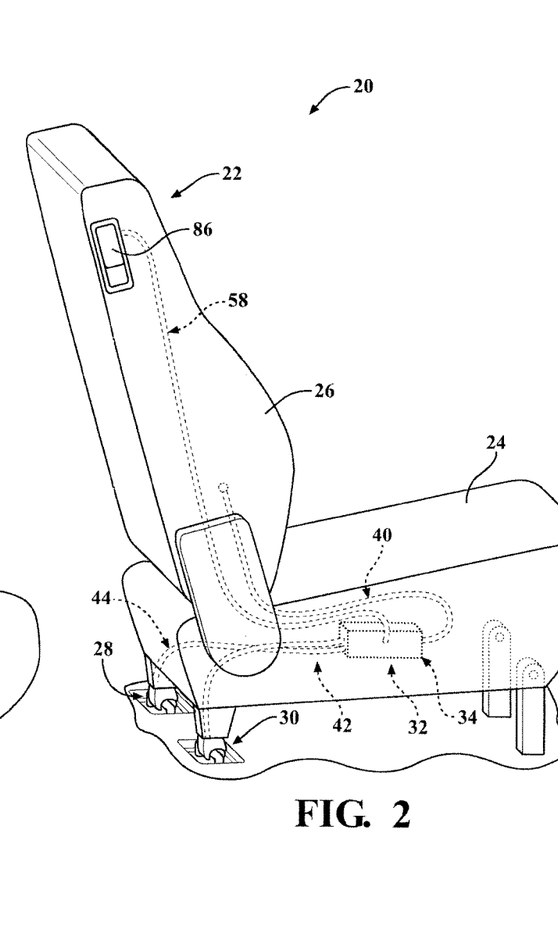
FIG. 2 is a perspective view of the seat assembly showing the seat in a design configuration and with the first and second latches activated.

In the design configuration, shown in FIG. 2, the seat bottom 24 and the seat back 26 may have an angular configuration, with the seat bottom 24 substantially horizontal and the seat back 26 substantially vertical. In the design configuration the seat back 26 may support a user's back and the seat bottom 24 may support the user's legs. More specifically, the seat bottom 24 and the seat back 26 each have a contact surface with the contact surface of the seat back 26 engaging and supporting the user's back and the contact surface of the seat bottom 24 engaging and supporting the user's legs. Also, in the design configuration, each of the first and second latches 28, 30 may be activated and locked to corresponding receiver brackets. When activated, the first and second latches 28, 30 may be locked to the receiver brackets or may be capable of being locked to the receiver brackets.

Figure 3:
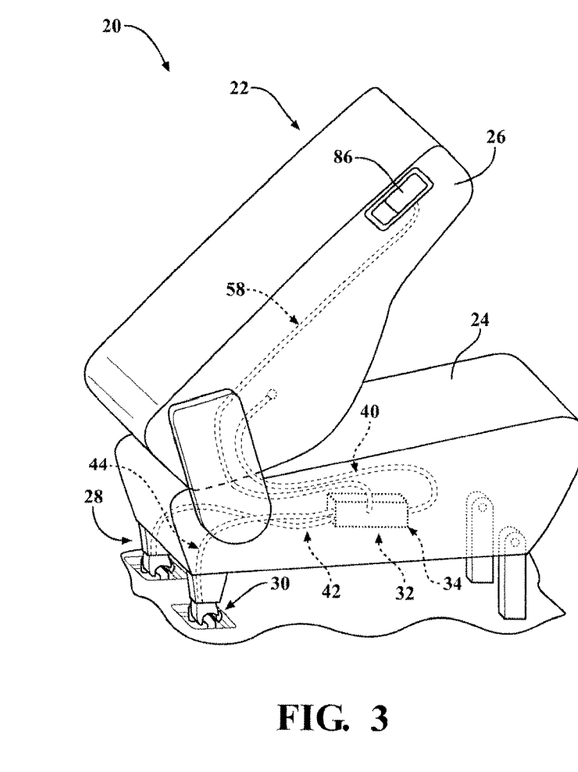
FIG. 3 is a perspective view of the seat assembly showing the seat in one of a plurality of folded configurations and with the first and second latches released.
Figure 6:
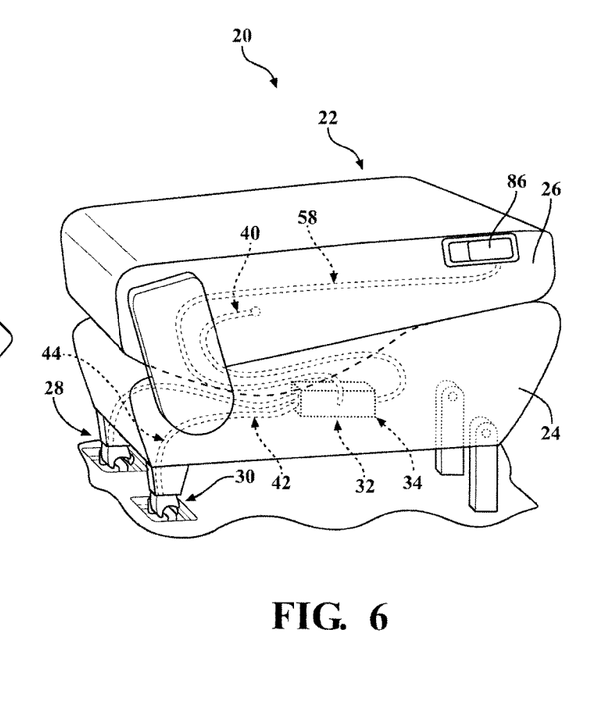
FIG. 6 is a perspective view of the seat assembly showing the seat in the another one of the folded configurations, with the first latch released and the second latch activated.

In the folded configurations, shown in FIGS. 3 and 6, the seat bottom 24 and the seat back 26 are disposed at any angle other than the angle between the seat bottom 24 and the seat back 26 in the design configuration. Said differently, in the folded configurations, the seat back 26 is rotated down from the design configuration toward the seat bottom 24. The folded configurations may refer to any angle of the seat back 26 relative to the seat bottom 24 other than the angle of the seat back 26 and the seat bottom 24 in the design configuration, and includes the seat back 26 lying against the seat bottom 24 in a substantially parallel configuration. As such, the folded configurations are an infinitesimal number of folded configurations as the seat backs is rotated down from the design configuration toward the seat bottom 24. Rotation of the seat back 26 relative to the seat bottom 24 may be initiated by rotating a lever. It is to be appreciated that rotation of the seat back 26 may initiated through any suitable device. In the one of the folded configurations, the second latch 30 may be activated and may be locked to the respective receiver bracket while the first latch 28 may be released, as shown in FIG. 6 and will be described in greater detail below. When released, the first and second latches 28, 30 cannot be locked to the receiver brackets.

Figure 4:
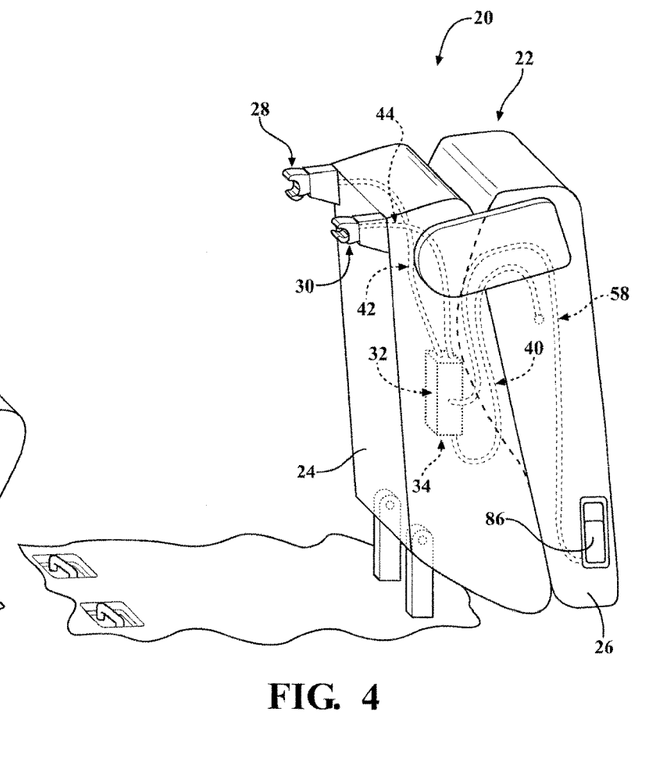
FIG. 4 is a perspective view of the seat assembly showing the seat in a stowed configuration, with the first latch released and with the second latch activated.
Figure 5:
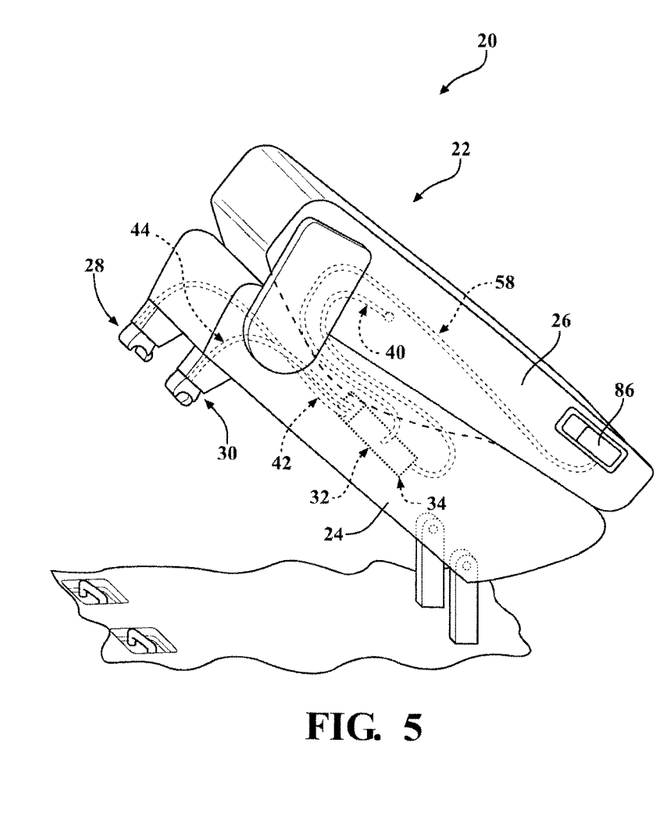
FIG. 5 is a perspective view of the seat assembly showing the seat between another stowed configuration rotated toward a floor, with the first latch released and with the second latch activated.

In the at least one stowed configuration, as shown in FIGS. 4 and 5, the seat bottom 24 and the seat back 26 may have a substantially parallel configuration, with both the seat bottom 24 and the seat back 26 pivoted away from a substantially horizontal orientation. Said differently, in the stowed configuration, the seat back 26 lays against the seat bottom 24. However, unlike the folded configuration, the seat bottom 24 and the seat back 26 are rotated as a unit about a pivotal coupling between the distal end of the seat bottom 24 and the vehicle, such that the first and second latches 28, 30 are rotated away from the receiver brackets. It is to be appreciated that the stowed configuration may be any position of the seat bottom 24 and the seat back 26 rotated about the distal end of the seat bottom 24. In the stowed configuration, the second latch 30 may be activated but spaced from the respective receiver bracket such that the second latch 30 is not locked with the receiver bracket. Also, in the stowed configuration, the first latch 28 may be released.

Figure 7:
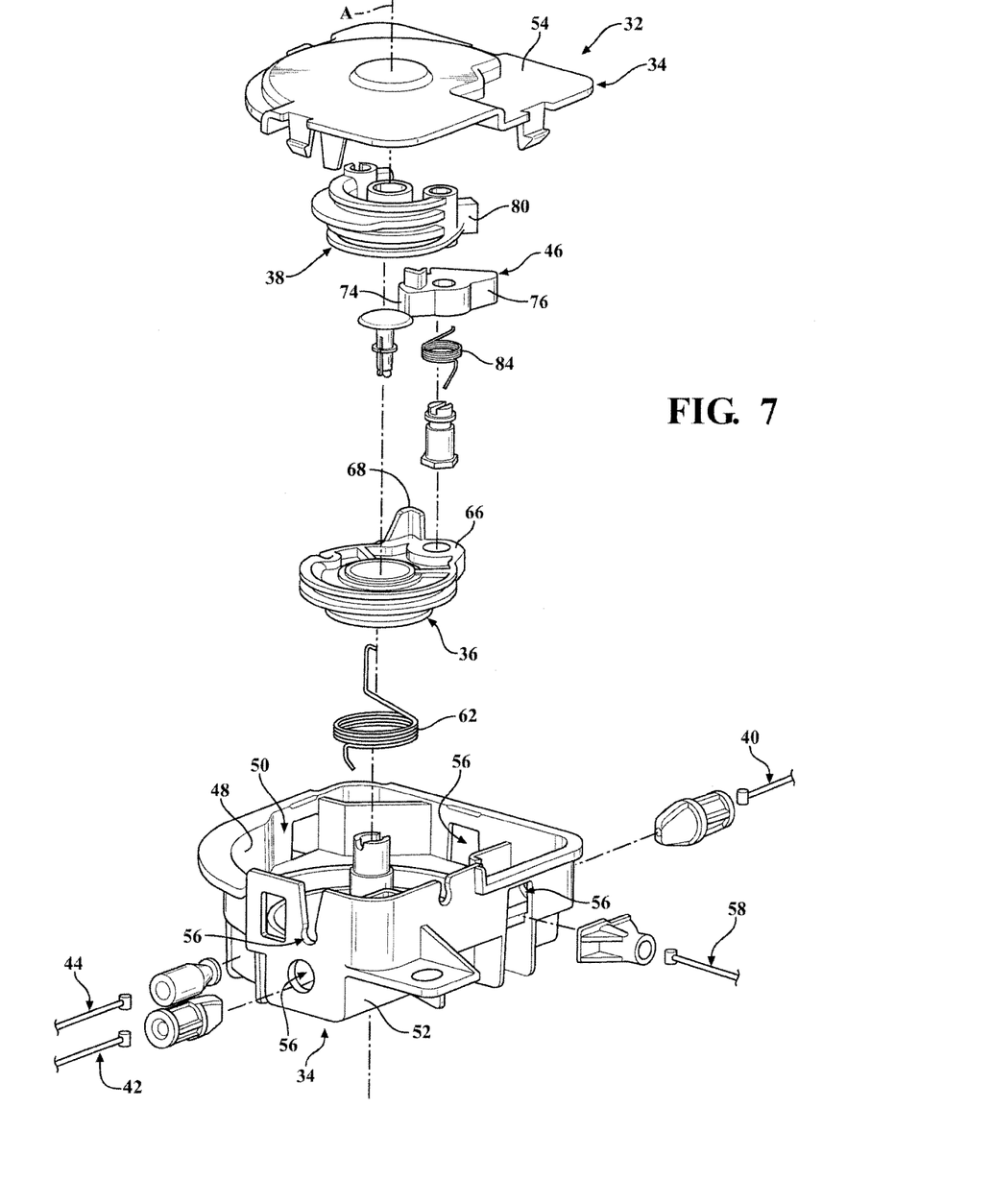
FIG. 7 is an exploded perspective view of the seat control system showing a housing having a first section and a second section, a first pulley, the second pulley, and a pawl.

As shown in FIG. 1, the seat assembly 20 includes a seat control system 32. As shown in FIG. 7, the seat control system 32 includes a housing 34 and a first pulley 36 coupled to the housing 34 and rotatable between a first position (shown in FIG. 8) corresponding to the design configuration, a second position (shown in FIG. 9) corresponding to one of the folded configurations, and a third position (shown in FIG. 11) corresponding to at one of the at least one stowed configuration. The seat control system 32 further includes a second pulley 38 coupled to the housing 34 and rotatable between a first position (shown in FIG. 8) corresponding to the design configuration and a second position (shown in FIG. 9) corresponding to the one of the folded configurations (i.e., the same one of the folded configurations that the first pulley 36 corresponds with in the second position).

Figure 8:
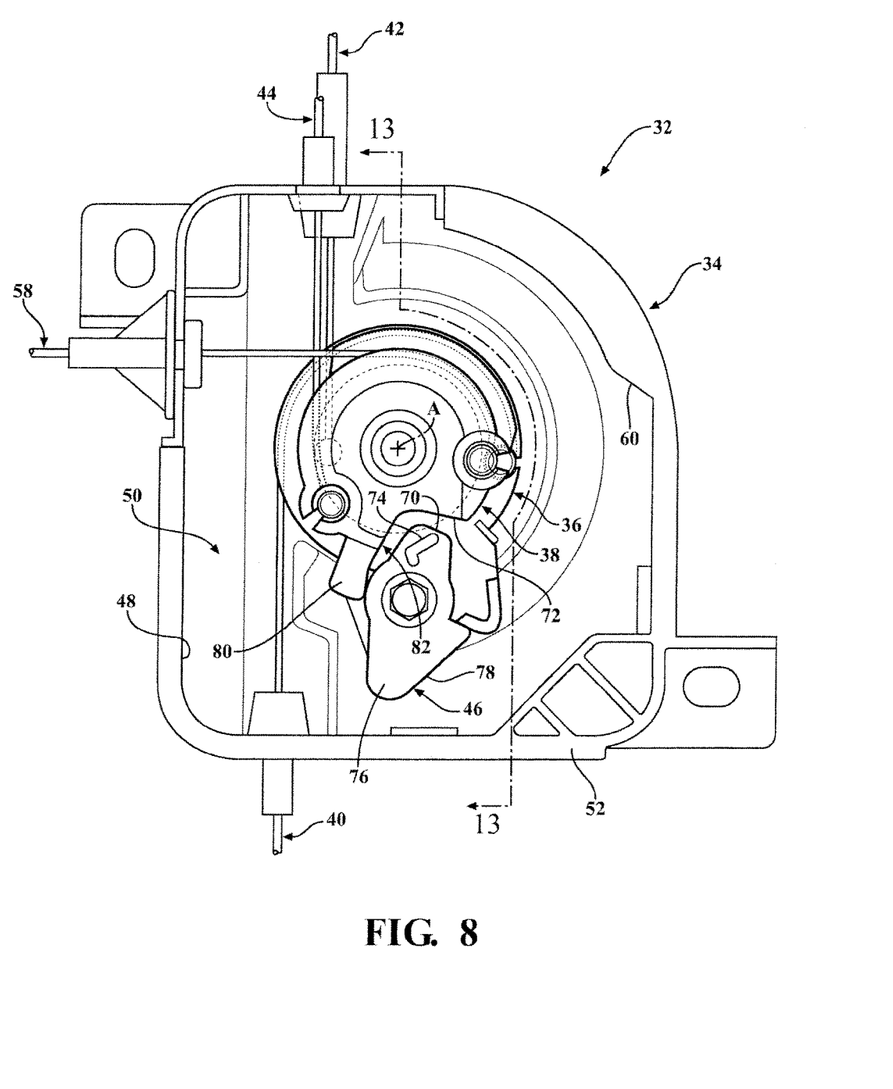
FIG. 8 is a top elevational view of the seat control system shown in FIG. 7 with the second section removed, with the first and second pulleys in first positions, and with the pawl engaged with the second pulley.

As shown in FIGS. 1, 7, and 8, the seat control system 32 further includes a first input cable 40 coupled to the first pulley 36 and the seat back 26, with the seat back 26 tensioning the first input cable 40 as the seat back 26 pivots toward the seat bottom 24 between the design and folded configurations, and with the first input cable 40 rotating the first pulley 36 when tensioned. Furthermore, the seat control system 32 includes a first output cable 42 coupled to the first pulley 36 and the first latch 28, with rotation of the first pulley 36 tensioning the first output cable 42 to actuate the first latch 28, and a second output cable 44 coupled to the second pulley 38 and the second latch 30, with rotation of the second pulley 38 tensioning the second output cable 44 to actuate the second latch 30.

Figure 9:
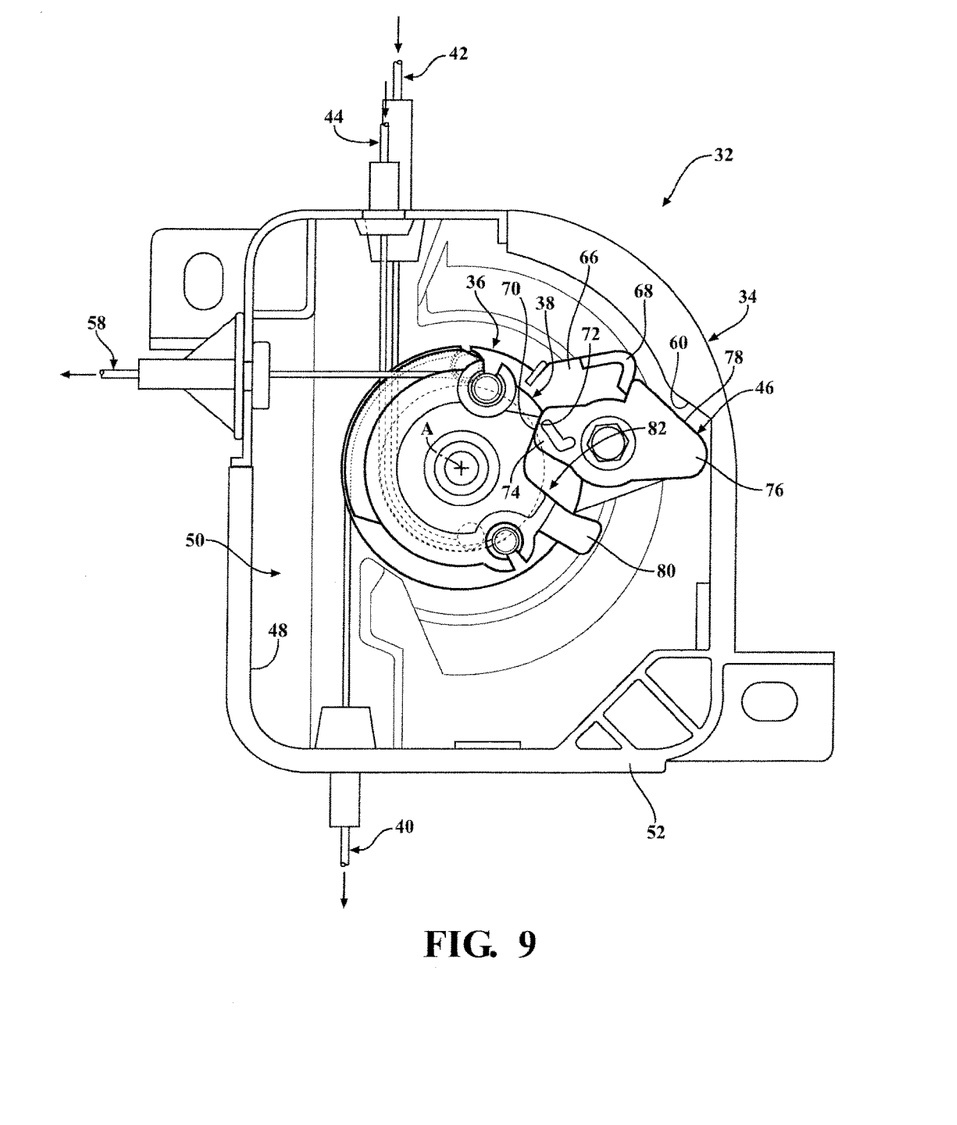
FIG. 9 is a top elevational view of the seat control system shown in FIG. 7 with the second section removed, with the first and second pulleys in second positions, and with the pawl engaged with the second pulley.

The seat control system 32 further includes a pawl 46 coupled to and movable with the first pulley 36 between the first, second, and third positions of the first pulley 36 and selectively rotatable relative to the first pulley 36. The pawl 46 engages the second pulley 38 to couple the first and second pulleys 36, 38 (as shown in FIGS. 8 and 9) such that the first and second pulleys 36, 38 rotate in unison from the first positions to the second positions for releasing the first and second latches 28, 30 in the one of the folded configurations. The pawl 46 disengages the second pulley 38 as the first pulley 36 rotates from the second position to the third position (as shown in FIG. 10) to decouple the first and second pulleys 36, 38 and permit rotation of the second pulley 38 back to the first position while the first pulley 36 is in the third position (as shown in FIG. 11) to activate the second latch 30 in the stowed configuration.

As shown in FIG. 7, the housing 34 may have an interior surface 48 defining an interior 50 with the first and second pulleys 36, 38 and the pawl 46 disposed within the interior 50. It is to be appreciated that any one of, or combination of, the first and second pulleys 36, 38 and the pawl 46 may be disposed outside of the interior 50. The housing 34 may have a first section 52 and a second section 54, with the first and second sections 52, 54 abutting and defining the interior 50. It is to be appreciated that the housing 34 may be comprised of any number of sections.

The housing 34 may define a plurality of holes 56 extending the between the interior 50 of the housing 34 and an exterior of the housing 34. Moreover, as shown in FIGS. 8-12, each of the first input cable 40 and the first and second output cables 42, 44 may individually extend through the holes 56 such that the first input cable 40 and the first and second output cables 42, 44 are partially disposed in the interior 50 of the housing 34 and partially disposed in the exterior of the housing 34. It is to be appreciated that more than one of the first input cable 40 and the first and second output cables 42, 44 may extend through a single hole 56. Furthermore, the seat control system 32 may further include a second input cable 58, which will be described in greater detail below. The second input cable 58 may extend through one of the plurality of holes 56 such that the second input cable 58 is partially disposed in the interior 50 of the housing 34 and partially disposed in the exterior of the housing 34.

Figure 10:
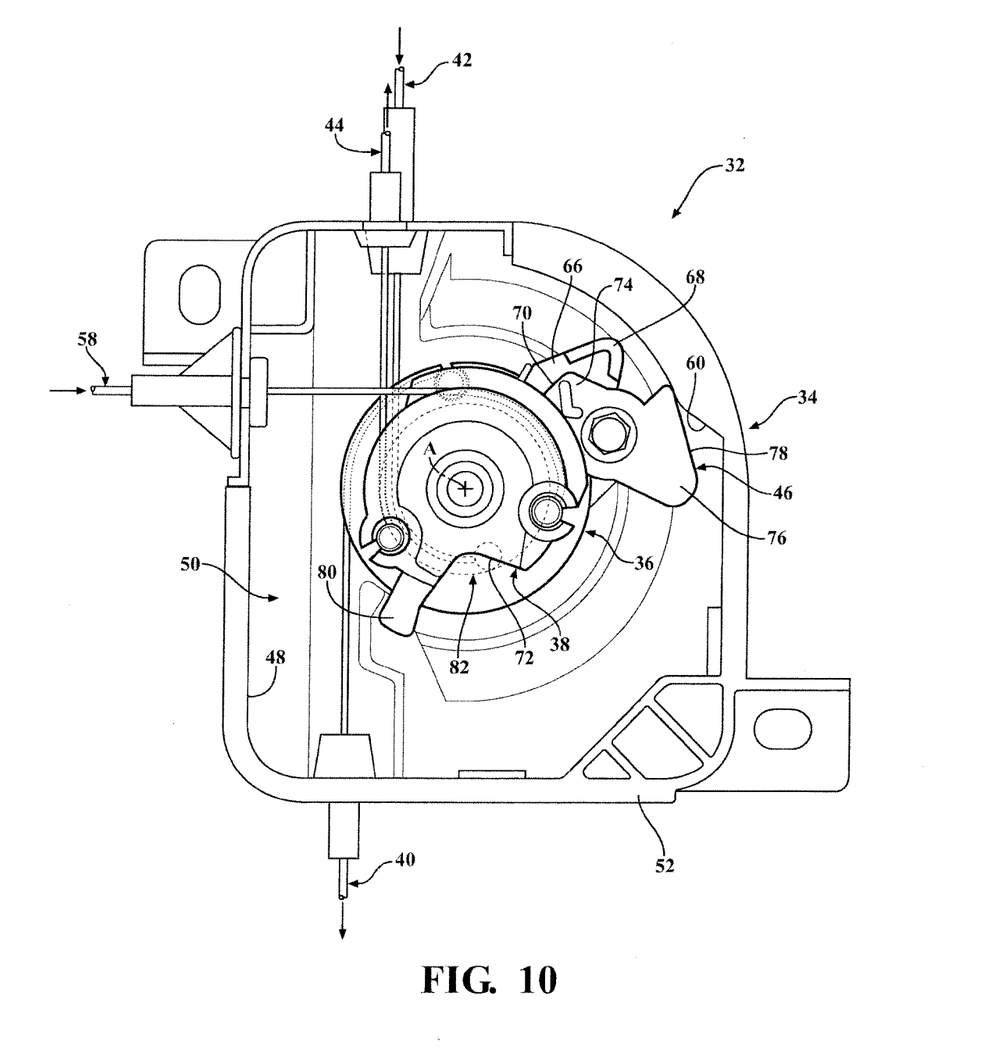
FIG. 10 is a top elevational view of the seat control system shown in FIG. 7 with the second section removed, with the pawl disengaged from the second pulley, with the first pulley between the second position and a third position, and with the second pulley in the first position.
Figure 11:
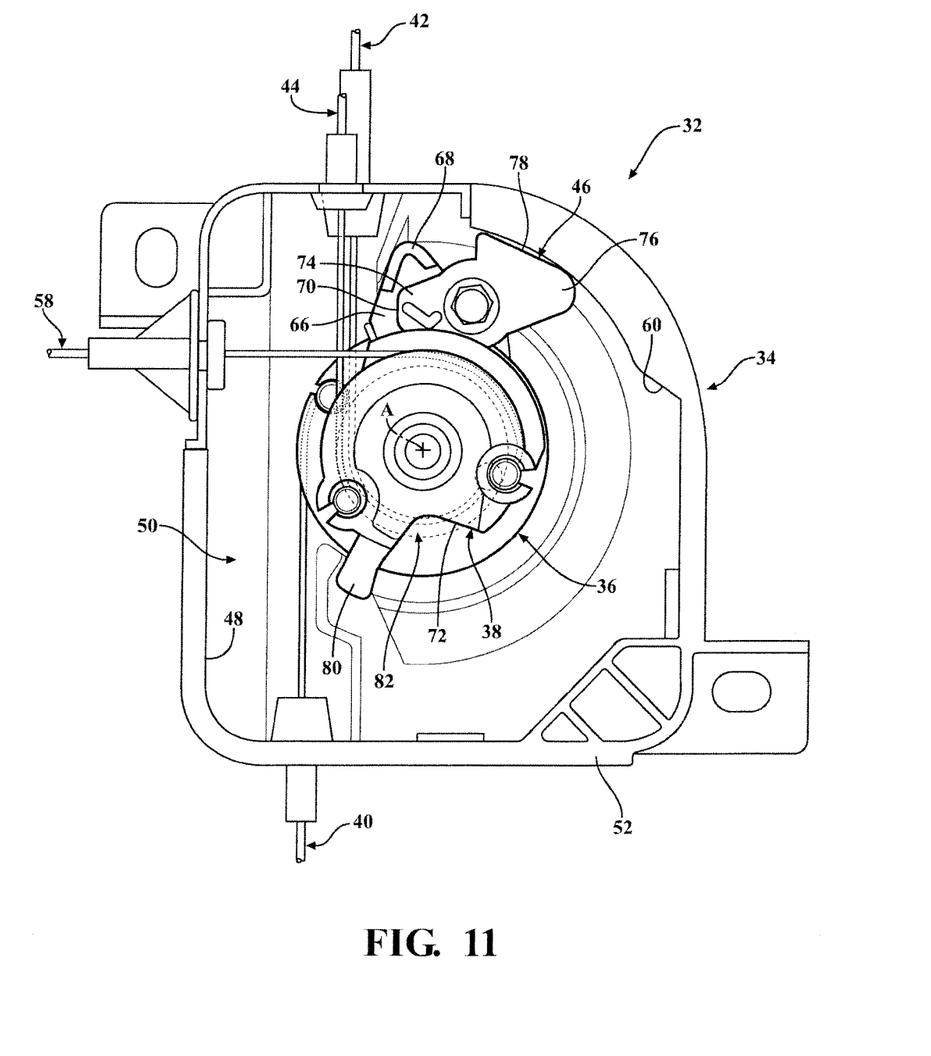
FIG. 11 is a top elevational view of the seat control system shown in FIG. 7 with the second section removed, with the pawl disengaged from the second pulley, with the first pulley in the third position, and with the second pulley in the first position.

The housing 34 may have an engagement surface 60, with the pawl 46 engaging the engagement surface 60, as shown in FIG. 10, and rotating independently of the first pulley 36 as the first pulley 36 rotates from the second position to the third position to disengage the second pulley 38. Moreover, the engagement surface 60 may be a portion of the interior surface 48 of the housing 34. As such, the engagement surface 60 may partially define the interior 50 of the housing 34. It is to be appreciated that the engagement surface 60 may be positioned anywhere along the housing 34. Furthermore, the pawl 46 may selectively engage the engagement surface 60. Said differently, the pawl 46 may be spaced from the engagement surface 60 or any other surface of the housing 34 between the first and second positions of the first pulley 36.

The engagement surface 60 may be angled to progressively rotate the pawl 46 relative to the first pulley 36 as the first pulley 36 rotates from the second position to the third position. Said differently, the engagement surface 60 may extend progressively further into a center of the interior 50, with the pawl 46 sliding along the angled engagement surface 60 and rotating relative to the first pulley 36 because of the angled orientation of the engagement surface 60.

Figure 13:
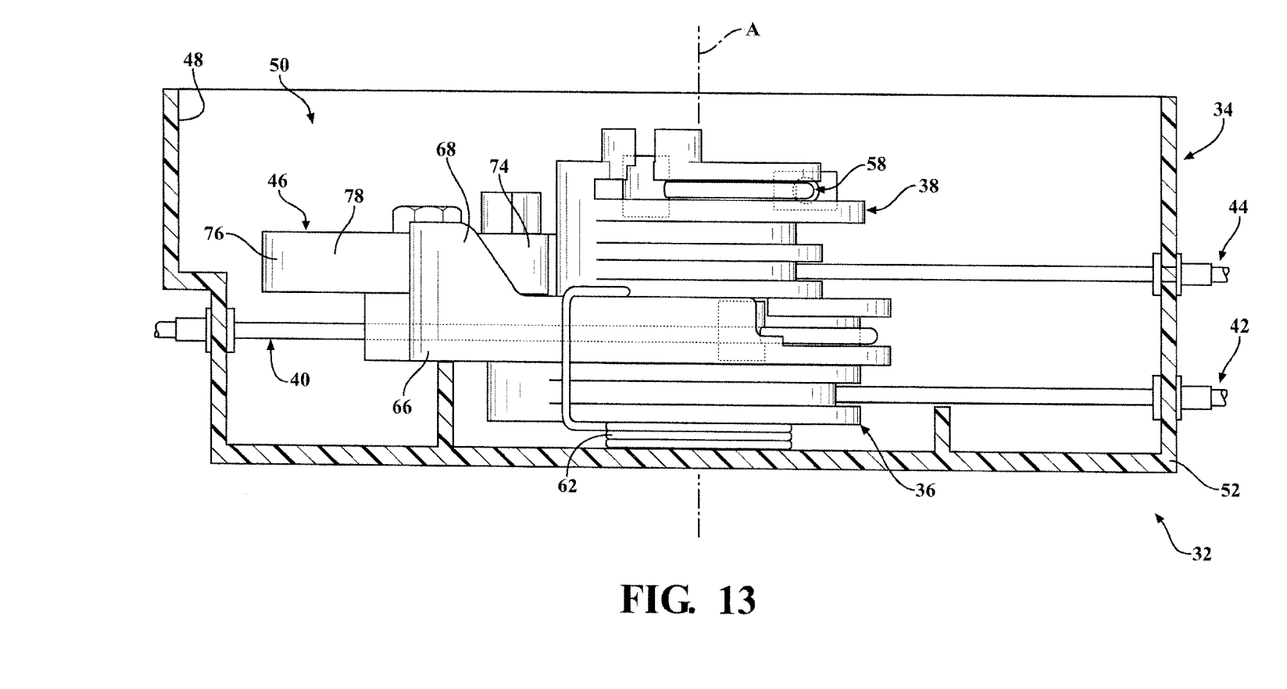
FIG. 13 is a cross-sectional view of the seat control system shown in FIG. 8 taken along 13-13.

As shown in FIGS. 7 and 13, the first pulley 36 and the second pulley 38 may both rotate about an axis A. The axis A may extend through the center of the interior 50. Moreover, the axis A may be spaced from the engagement surface 60 of the housing 34. It is to be appreciated that the axis A may be positioned anywhere relative to the housing 34.

The first and second pulleys 36, 38 may be disposed along the axis A on substantially parallel planes. Said differently, the first and second pulleys 36, 38 have substantially flat, disk-like configurations with the pulleys extending radially from the axis A on substantially parallel planes. As shown in FIG. 13, the first and second pulleys 36, 38 may abut one another along the axis A. It is to be appreciated that the first and second pulleys 36, 38 may be spaced from one another along the axis A. The pawl 46 and the engagement surface 60 may be positioned on the same plane as the second pulley 38 to facilitate selective engagement of the pawl 46 with the second pulley 38. It is to be appreciated that the pawl 46, the engagement surface 60, and the second pulley 38 may be positioned on different planes.

As shown in FIGS. 8-12, the first and second output cables 42, 44 may be wound around the first and second pulleys 36, 38 in a first direction and the first input cable 40 may be wound around the first pulley 36 in a second direction opposing the first direction such that tensioning of the first input cable 40 selectively tensions the first and second output cables 42, 44. As such, the seat control system 32 is commonly referred to in the art as a pull-pull cable system. Moreover, the second input cable 58 may be wound around the second pulley 38 in the second direction. It is to be appreciated that the first and second input cables 40, 58 and the first and second output cables 42, 44 may be wound around the first and second pulleys 36, 38 in any suitable direction.

The second pulley 38 may rotate independent of the first pulley 36 when the pawl 46 is disengaged from the second pulley 38. Moreover, the second pulley 38 may rotate in a direction opposing the first pulley 36 when the pawl 46 is disengaged from the second pulley 38. It is to be appreciated that the second pulley 38 may rotate in any suitable manner, including with the first pulley 36, when the pawl 46 is disengaged from said second pulley 38.

Figure 14:
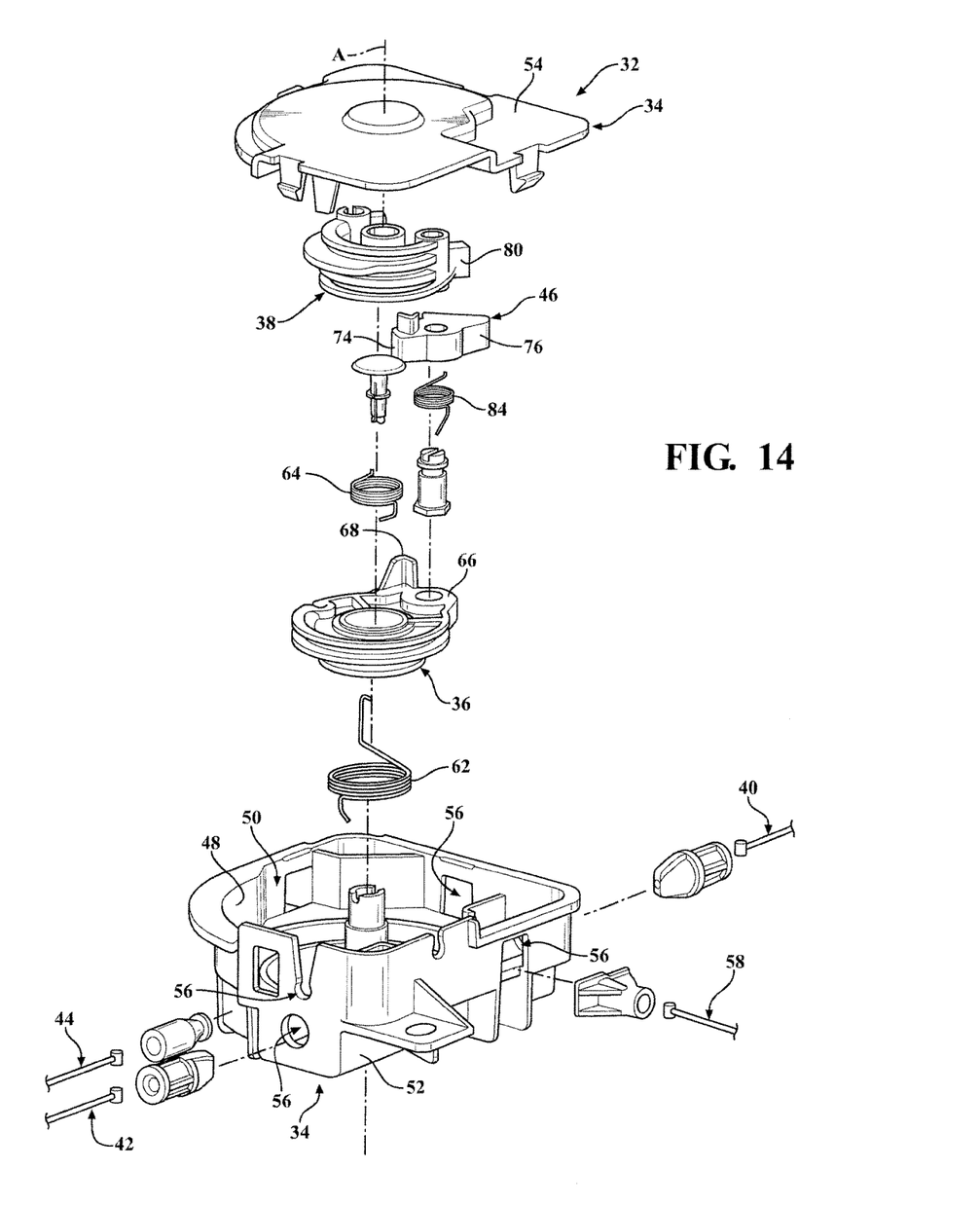
FIG. 14 is an exploded perspective view of the seat control system showing the housing having the first section and the second section, the first pulley, the second pulley, the pawl, and a second biasing member coupled to the second pulley.

The first pulley 36 may be biased toward the first position. In one embodiment, the first and second latches 28, 30 are biased toward activation. As such, the bias of the first latch 28 places tension on the first output cable 42 which biases the first pulley 36 toward the first position. In another embodiment, as shown in FIGS. 7 and 14, the seat control system 32 includes a first pulley biasing member 62 coupled to the housing 34 and the first pulley 36. The first pulley biasing member 62 biases the first pulley 36 toward the first position. It is to be appreciated that the first pulley 36 may biased toward the first direction through the use of any suitable configuration.

The second pulley 38 may be biased toward the first position, with disengagement of the pawl 46 from the second pulley 38 permitting rotation of the second pulley 38 to the first position. As described above, the first and second latches 28, 30 may be biased toward activation. As such, the bias of the second latch 30 may place tension on the second output cable 44 which may bias the second pulley 38 toward the first position, as shown in FIG. 7. In another embodiment, the seat control system 32 includes a second pulley biasing member 64 coupled to the housing 34 and the second pulley 38, as shown in FIG. 14. The second pulley biasing member 64 biases the second pulley 38 toward the first position. It is to be appreciated that the second pulley 38 may biased toward the first direction through the use of any suitable configuration.

As shown in FIGS. 8-12, the pawl 46 may be radially spaced from the axis A to impart torque on the second pulley 38 as the first pulley 36 rotates from the first position to the second position. Said differently, the pawl 46 may be rotatably coupled to the first pulley 36 spaced from the axis A. The first pulley 36 may have a projection 66 extending radially from the axis A, with the pawl 46 rotatably coupled to and supported by the projection 66. The projection 66 may extend radially outward from the flat, disk-like configuration of the first pulley 36. The projection 66 and the pawl 46 may be on substantially parallel planes. As such, the projection 66 provides a bearing surface which the pawl 46 may move along as the pawl 46 rotates relative to the first pulley 36.

The first pulley 36 may have a stop bracket 68 extending from the projection 66 substantially parallel to the axis A. The stop bracket 68 may selectively engaged by the pawl 46 to align the pawl 46 relative to the first pulley 36. Said differently, the pawl 46 may engage the stop bracket 68 to prevent over rotation relative to first pulley 36. As such, the stop bracket 68 partially defines the degrees of rotation of the pawl 46 between engagement and disengagement with the second pulley 38.

As shown in FIGS. 8 and 9, each of the pawl 46 and the second pulley 38 may have an abutment surface 70, 72 opposing one another and transverse to the axis A to engage the pawl 46 with the second pulley 38 and couple the first and second pulleys 36, 38 such that first and second pulleys 36, 38 rotate in unison from the first positions to the second positions. Because each of the abutment surfaces 70, 72 are transverse to the axis A, the pawl 46 may engage the second pulley 38 at the abutment surfaces 70, 72 and exert a force on the second pulley 38 transverse to the axis A, which is a torque on the second pulley 38.

The pawl 46 may have a first portion 74 extending substantially toward the axis A and presenting the abutment surface 70 to engage the abutment surface 72 of the second pulley 38. Likewise, the pawl 46 may have a second portion 76 extending substantially away from the axis A and opposing the first portion 74, with the second portion 76 engaging the engagement surface 60 of the housing 34 as the first pulley 36 rotates from the second position to the third position to disengage the pawl 46 from the second pulley 38. As such, the pawl 46 may have a substantially rectangular configuration, with pawl 46 rotatably coupled to the first pulley 36 and extending in opposing directions to distal ends and defining the first and second portions 74, 76. The abutment surface 70 may be disposed at the distal end of the first portion 74. The second portion 76 may have a transition surface 78 extending to the distal end. The transition surface 78 may engage the engagement surface 60 of the housing 34 as the pawl 46 rotates from the second position to the third position. The angular configuration of the engagement surface 60 and the orientation of the transition surface 78 extending to the distal end of the second portion 76 permits the engagement surface 60 to exert a transverse force on the second portion 76 of the pawl 46, which causes the pawl 46 to rotate relative to the first pulley 36.

As shown in FIGS. 8-12, the second pulley 38 may have a leg 80 transverse to the abutment surface 72 of the second pulley 38. The leg 80 may extend radially from the axis A. As such, the leg 80 and the abutment surface 72 of the second pulley 38 may define a notch 82 which provides clearance for the pawl 46 as the pawl 46 rotates relative to the first pulley 36. Said differently, the notch 82 may be configured allow the first portion 74 of the pawl 46 to rotate into and out of the notch 82, which allows for engagement of the pawl 46 with the second pulley 38 when the first portion 74 is in the notch 82 and disengagement of the pawl 46 from the second pulley 38 when the first portion 74 rotates out of the notch 82.

As shown in FIGS. 7 and 14, the seat control system 32 may further include a biasing member 84 coupled to the pawl 46 and biasing the pawl 46 toward second pulley 38 to permit engagement of the pawl 46 with the second pulley 38. The biasing member 84 may be coupled to each of the pawl 46 and the first pulley 36. The biasing member 84 may bias the second portion 76 of the pawl 46 toward the stop of the first pulley 36. The second portion 76 of the pawl 46 may engage the stop when the abutment surface 70 of the pawl 46 is aligned to engage the abutment surface 72 of the second pulley 38. It is to be appreciated that the biasing member 84 may bias the pawl 46 in any suitable direction.

As shown in FIGS. 1-6, the seat control system 32 may further include the second input cable 58 coupled to the second pulley 38 and coupled to a handle 86 of the seat 22, with the second input cable 58 rotating the second pulley 38 from the first position to the second position when tensioned for releasing the second latch 30. As described above, the first and second pulleys 36, 38 may rotate independently of one another. In particular, the first pulley 36 and the second pulley 38 are disengaged when the first pulley 36 is in the third position. The tensioning of the second input cable 58 by the handle 86 rotates the second pulley 38 to the second position to releasing the second latch 30. The handle 86 may be the same component as the lever described above. It is to be appreciated that the handle 86 may be independent of the lever.

Furthermore, the second pulley 38 may have the leg 80, which may engage the pawl 46 when the first pulley 36 is in the first position and the second pulley 38 is in the first position to couple the first and second pulleys 36, 38 such that the first and second pulleys 36, 38 rotate in unison from the first position to the second position when the second input cable 58 is in tension for releasing the first and second latches 28, 30. As such, the user may manipulate the handle 86 to tension the second input cable 58 and move both the first and second pulleys 36, 38 in unison from the first position to the second position, which releases the first and second latches 28, 30.

The operation of moving the seat 22 from the design configuration to the folded configuration and to the stowed configuration is described below and shown in FIGS. 2-6 and 8-11.

With the seat 22 in the design configuration (shown in FIG. 2), the seat bottom 24 is substantially horizontal and the seat back 26 is substantially vertical. Each of the first and second latches 28, 30 are activated and locked to the corresponding receiver brackets fixed to the vehicle. The first and second pulleys 36, 38 are in the first positions and the pawl 46 engages the second pulley 38.

The user rotates the seat back 26 down toward the seat back 26 from the design configuration to the one of the plurality of folded configurations, as shown in FIG. 3. The rotation of the seat back 26 tensions the first input cable 40 which rotates the first pulley 36 from the first position (as shown in FIG. 8) to the second position (as shown in FIG. 9). The engagement of the pawl 46 with the second pulley 38 causes the second pulley 38 to rotate in unison with the first pulley 36 from the first positions to the second positions. The rotation of the first and second pulleys 36, 38 in unison from the first positions to the second positions tensions both the first output cable 42 and the second output cable 44, which releases both of the first and second latches 28, 30, as shown in FIG. 3. Release of the first and second latches 28, 30 allows further movement of the seat 22 to the stowed position, as shown in FIG. 4. The one of the plurality of folded configurations which corresponds with the second positions of the first and second pulleys 36, 38 is shown in FIG. 3 as an angle between the seat bottom 24 and the seat back 26 of approximately 45 degrees. It is to be appreciated that the angle corresponding with the second positions of the first and second pulleys 36, 38 may be any suitable angle. As such, the one of the folded configurations corresponding with second positions of the first and second pulleys 36, 38 may be any one of the plurality of folded configurations.

To retain the seat 22 in the folded configuration, the user continues to rotate the seat back 26 toward the seat bottom 24. This movement may be accompanied with the movement of the seat 22 to the stowed configuration, as shown in FIG. 5. The rotation of the seat back 26 relative to the seat bottom 24 continues to tension the first input cable 40 which rotates the first pulley 36 from the second position (shown in FIG. 9) toward the third position. The engagement of the pawl 46 with the second pulley 38 causes the second pulley 38 to rotate in unison with the first pulley 36 from the second positions toward the third position of the first pulley 36. As shown in FIG. 10, the pawl 46 engages the engagement surface 60 of the housing 34 and disengages the second pulley 38, allowing the second pulley 38 to rotate independent of the first pulley 36. The first pulley 36 is biased toward and rotates back to the first position, which activates the second latch 30, as shown in FIG. 5. The user may push the seat back 26 down from the stowed configuration to one of the folded configurations, as shown in FIG. 6. With the second pulley 38 in the first position and the second latch 30 activated, the second latch 30 will lock with the respective receiver bracket of the vehicle to prevent unanticipated rotation of the seat bottom 24 relative to the vehicle. The first pulley 36 will return to the second position and the first latch 28 will remain released. As such, the seat 22 may be retained in the folded configuration by the second latch 30 locked to the respective receiver bracket.

Alternatively, after the seat 22 has moved from folded configuration to the stowed configuration, the user may leave the seat 22 in the stowed configuration, with the first pulley 36 in the third position, the second pulley 38 in the first position, the first latch 28 released, and the second latch 30 activated, as described above.

The operation of moving the seat 22 from the stowed configuration to the folded configuration, and then to either the design configuration or the stowed configuration is described below and shown in FIGS. 2-6 and 8-11.

With the seat 22 in the stowed configuration, as shown in FIG. 4, the user may rotate the seat bottom 24 and the seat back 26 as a unit from the substantially vertical orientation to the substantially horizontal orientation, as shown in FIG. 6. As previously described, the second pulley 38 is in the first position (as shown in FIG. 11) and the second latch 30 is activated. With the seat bottom 24 and the seat back 26 in the folded configuration shown in FIG. 6, the second latch 30 locks with the respective receiver bracket of the vehicle to prevent unanticipated rotation of the seat bottom 24 relative to the vehicle.

To move the seat 22 to the design configuration, the user rotates the seat back 26 relative to the seat bottom 24 until the seat back 26 and seat bottom 24 have an angular configuration, as shown in FIG. 2, with the seat bottom 24 substantially horizontal and the seat back 26 substantially vertical.

Figure 12:
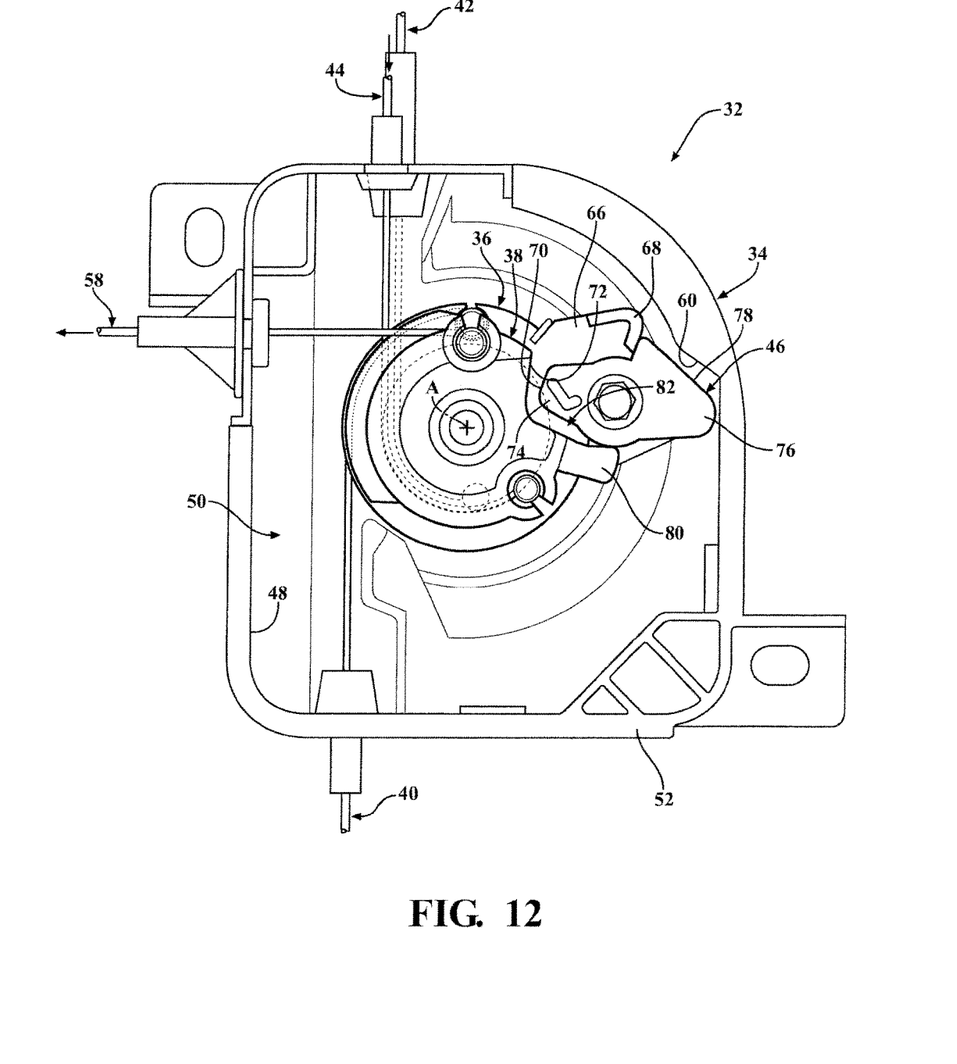
FIG. 12 is a top elevational view of the seat control system shown in FIG. 7 with the second section removed, with the pawl disengaged from the second pulley, with the first pulley between the second position and the third position, and with the second pulley in the second position.

Alternatively, after the seat 22 has moved from stowed configuration to the folded configuration (as shown in FIG. 6), the user may move the seat 22 back to the stowed configuration (as shown in FIG. 4). The user manipulates the handle 86 which tensions the second input cable 58 and rotates the second pulley 38 independently of the first pulley 36 from the first position (as shown in FIG. 11) to the second position (as shown in FIG. 12). If the seat back 26 is lying against the seat bottom 24, the first pulley is in the third position with the first latch 28 released. If the seat back 26 is angled relative to the seat bottom 24 to the one of the plurality of folded configurations, the first pulley 36 is in the second position as shown in FIG. 12. When the second pulley 38 is in the second position, the pawl 46 engages the second pulley 38 and the second latch 30 releases. The first latch 28 was already released in the second position. As such, the seat bottom 24 and the seat back 26 may rotate to the stowed configuration in accordance with the operation previously described.

Accordingly, the subject invention provides the advantage of allowing selective independent rotation of the first and second pulleys 36, 38. As such, the first and second output cables 42, 44 may be selectively tensioned independent of one another. The selective independent tensioning of the first and second output cables 42, 44 facilitates selective activation of the second latch 30 independent of the first latch 28, allowing the second latch 30 to couple the seat 22 to the vehicle in the folded configuration. The selective independent rotation of the second pulley 38 allows the second pulley 38 to rotate, tension the second output cable 44, and release the second latch 30 to allow for movement of the seat 22 to the stowed configuration without tensioning the first input cable 40 and rotating the first pulley 36. Therefore, the seat 22 may move from the folded configuration to the stowed configuration without first having to move to the design configuration.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A seat control system for use with a seat of a vehicle, with the seat having a seat bottom, a seat back, and first and second latches, with the seat movable between a design configuration, a plurality of folded configurations, and at least one stowed configuration; said seat control system comprising:
   a housing;
   a first pulley coupled to said housing and rotatable between a first position, a second position, and a third position;
   a second pulley coupled to said housing and rotatable between a first position and a second position;
   a first input cable coupled to said first pulley, with said first input cable rotating said first pulley when tensioned;
   a first output cable coupled to said first pulley and configured to be coupled to the first latch, with rotation of said first pulley tensioning said first output cable for actuating the first latch;
   a second output cable coupled to said second pulley and configured to be coupled to the second latch, with rotation of said second pulley tensioning said second output cable for actuating the second latch; and a pawl coupled to and movable with said first pulley between said first, second, and third positions of said first pulley and selectively rotatable relative to said first pulley, with said pawl engaging said second pulley to couple said first and second pulleys such that said first and second pulleys rotate in unison from said first positions to said second positions for releasing the first and second latches, and said pawl disengaging said second pulley as said first pulley rotates from said second position to said third position to decouple said first and second pulleys and permit rotation of said second pulley back to said first position while said first pulley is in said third position for activating the second latch.

2. The seat control system as set forth in claim 1, wherein said second pulley is biased toward said first position, with disengagement of said pawl from said second pulley permitting rotation of said second pulley to said first position.

3. The seat control system as set forth in claim 1, further including a biasing member coupled to said pawl and biasing said pawl toward said second pulley to permit engagement of said pawl with said second pulley.

4. The seat control system as set forth in claim 1, wherein said second pulley rotates independent of said first pulley when said pawl is disengaged from said second pulley.

5. The seat control system as set forth in claim 1, wherein said housing has an engagement surface, with said pawl engaging said engagement surface and rotating independently of said first pulley as said first pulley rotates from said second position to said third position to disengage said second pulley.

6. The seat control system as set forth in claim 5, wherein said engagement surface is angled to progressively rotate said pawl relative to said first pulley as said first pulley rotates from said second position to said third position.

7. The seat control system as set forth in claim 1, further including a second input cable coupled to said second pulley and configured to be coupled to a handle of the seat, with said second input cable rotating said second pulley from said first position to said second position when tensioned for releasing the second latch.

8. The seat control system as set forth in claim 7, wherein said second pulley has a leg engaging said pawl when said first pulley is in said first position and said second pulley is in said first position to couple said first and second pulleys such that said first and second pulleys rotate in unison from said first position to said second position when said second input cable is in tension for releasing the first and second latches.

9. The seat control system as set forth in claim 1, wherein said first pulley and said second pulley both rotate about an axis.

10. The seat control system as set forth in claim 9, wherein said first and second pulleys are disposed along said axis on substantially parallel planes.

11. The seat control system as set forth in claim 9, wherein said pawl is radially spaced from said axis to impart torque on said second pulley as said first pulley rotates from said first position to said second position.

12. The seat control system as set forth in claim 9, wherein said first and second output cables are wound around said first and second pulleys in a first direction and said first input cable is wound around said first pulley in a second direction opposing said first direction such that tensioning of said first input cable selectively tensions said first and second output cables.

13. The seat control system as set forth in claim 9, wherein said first pulley has a projection extending radially from said axis, with said pawl rotatably coupled to and supported by said projection.

14. The seat control system as set forth in claim 13, wherein said first pulley has a stop bracket extending from said projection substantially parallel to said axis, with said stop bracket selectively engaged by said pawl to align said pawl relative to said first pulley.

15. The seat control system as set forth in claim 9, wherein each of said pawl and said second pulley have an abutment surface opposing one another and transverse to said axis to engage said pawl with said second pulley and couple said first and second pulleys such that first and second pulleys rotate in unison from said first positions to said second positions.

16. The seat control system as set forth in claim 15, wherein said pawl has a first portion extending substantially toward said axis and presenting said abutment surface to engage said abutment surface of said second pulley.

17. The seat control system as set forth in claim 16, wherein said pawl has a second portion extending substantially away from said axis and opposing said first portion, with said second portion engaging an engagement surface of said housing as said first pulley rotates from said second position to said third position to disengage said pawl from said second pulley.

18. The seat control system as set forth in claim 16, wherein said second pulley has a leg transverse to said abutment surface of said second pulley.

19. The seat control system as set forth in claim 18, wherein said leg and said abutment surface of said second pulley define a notch which provides clearance for said pawl as said pawl rotates relative to said first pulley.

20. A seat assembly for a vehicle comprising:
a seat movable between a design configuration, a plurality of folded configurations, and at least one stowed configuration; said seat comprising:
a seat bottom;
a seat back pivotally coupled to said seat bottom; and
first and second latches fixed to said seat bottom; and
a seat control system comprising:
a housing;
a first pulley coupled to said housing and rotatable between a first position corresponding to said design configuration, a second position corresponding to one of said folded configurations, and a third position corresponding to said stowed configuration;
a second pulley coupled to said housing and rotatable between a first position corresponding to said design configuration and a second position corresponding to said one of said folded configurations;
a first input cable coupled to said first pulley and said seat back, with said seat back tensioning said first input cable as said seat back pivots toward said seat bottom between said design and folded configurations, and with said first input cable rotating said first pulley when tensioned;
a first output cable coupled to said first pulley and said first latch, with rotation of said first pulley tensioning said first output cable to actuate said first latch;
a second output cable coupled to said second pulley and said second latch, with rotation of said second pulley tensioning said second output cable to actuate said second latch; and
a pawl coupled to and movable with said first pulley between said first, second, and third positions of said first pulley and selectively rotatable relative to said first pulley, with said pawl engaging said second pulley to couple said first and second pulleys such that said first and second pulleys rotate in unison from said first positions to said second positions for releasing said first and second latches in said one of said folded configurations, and said pawl disengaging said second pulley as said first pulley rotates from said second position to said third position to decouple said first and second pulleys and permit rotation of said second pulley back to said first position while said first pulley is in said third position to activate said second latch in said stowed configuration.

21. The seat assembly as set forth in claim 20, wherein said seat includes a handle and wherein said seat control system further includes a second input cable coupled to said second pulley and said handle, with said second input cable rotating said second pulley from said first position to said second position when tensioned to release said second latch.

22. The seat assembly as set forth in claim 20, wherein said second pulley rotates independent of said first pulley when said pawl is disengaged from said second pulley.

23. The seat assembly as set forth in claim 20, wherein said housing has an engagement surface, with said pawl engaging said engagement surface and rotating independently of said first pulley as said first pulley rotates from said second position to said third position to disengage said second pulley.

24. The seat assembly as set forth in claim 20, wherein said second pulley is biased toward said first position, with disengagement of said pawl from said second pulley permitting rotation of said second pulley to said first position.

25. The seat assembly as set forth in claim 20, wherein said first pulley and said second pulley both rotate about an axis.

* * * * *